US012327264B1

(12) United States Patent
Devereaux et al.

(10) Patent No.: US 12,327,264 B1
(45) Date of Patent: *Jun. 10, 2025

(54) SYSTEMS AND METHODS FOR UTILIZING IMAGING INFORMATICS

(71) Applicant: United Services Automobile Association (USAA), San Antonio, TX (US)

(72) Inventors: Ramsey Devereaux, San Antonio, TX (US); David S. Franck, San Antonio, TX (US); Michael J. Allen, San Antonio, TX (US); Daniela M. Wheeler, Boerne, TX (US); Spencer E. Read, Helotes, TX (US); Kathleen L Swain, Kemah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/577,225

(22) Filed: Jan. 17, 2022

Related U.S. Application Data

(63) Continuation of application No. 16/230,387, filed on Dec. 21, 2018, now Pat. No. 11,227,339, which is a (Continued)

(51) Int. Cl.
*G06Q 30/00* (2023.01)
*G06Q 10/20* (2023.01)
(Continued)

(52) U.S. Cl.
CPC ......... *G06Q 30/0215* (2013.01); *G06Q 10/20* (2013.01); *G06Q 40/03* (2023.01);
(Continued)

(58) Field of Classification Search
CPC ....................................................... G06Q 40/03
See application file for complete search history.

(56) References Cited

U.S. PATENT DOCUMENTS 5,182,705 A 1/1993 Barr et al.
5,235,507 A 8/1993 Sackler et al.
(Continued)

FOREIGN PATENT DOCUMENTS

AT 503861 B1 6/2008
CA 2478911 A1 9/2003
(Continued)

OTHER PUBLICATIONS

NFPA and its implications on thermographic inspections IEEE (Year: 2009).*
(Continued)

*Primary Examiner* — Bruce I Ebersman
(74) *Attorney, Agent, or Firm* — Fletcher Yoder, PC

(57) ABSTRACT

A computer device and method for processing an insurance claim and making decisions regarding an insurance policy utilizing informatic data received from one or more informatic camera sensor devices configured to capture imagery data relating to an insured property. Analysis is performed on the received imagery informatic data to determine an assessment variable regarding the insured property. An insurance policy associated with the insured property is also received by the computer and analyzed to determine insurance coverage terms and conditions for the insured property. Predefined business rules are preferably applied by the computer using at least the determined assessment variable and the determined insurance coverage terms and conditions for the insured property to determine an event relating to the insurance policy associated with the insured property.

14 Claims, 4 Drawing Sheets

Related U.S. Application Data continuation of application No. 14/324,618, filed on Jul. 7, 2014, now Pat. No. 10,163,162.

(60) Provisional application No. 61/948,192, filed on Mar. 5, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/926,534, filed on Jan. 13, 2014, provisional application No. 61/926,536, filed on Jan. 13, 2014, provisional application No. 61/926,541, filed on Jan. 13, 2014, provisional application No. 61/926,532, filed on Jan. 13, 2014, provisional application No. 61/926,093, filed on Jan. 10, 2014, provisional application No. 61/926,121, filed on Jan. 10, 2014, provisional application No. 61/926,095, filed on Jan. 10, 2014, provisional application No. 61/926,103, filed on Jan. 10, 2014, provisional application No. 61/926,108, filed on Jan. 10, 2014, provisional application No. 61/926,123, filed on Jan. 10, 2014, provisional application No. 61/926,118, filed on Jan. 10, 2014, provisional application No. 61/926,091, filed on Jan. 10, 2014, provisional application No. 61/926,119, filed on Jan. 10, 2014, provisional application No. 61/926,098, filed on Jan. 10, 2014, provisional application No. 61/926,114, filed on Jan. 10, 2014, provisional application No. 61/926,111, filed on Jan. 10, 2014.

(51) Int. Cl.
G06Q 30/0207 (2023.01)
G06Q 40/03 (2023.01)
G06Q 40/08 (2012.01)
G06V 20/10 (2022.01)
G06Q 40/00 (2023.01)

(52) U.S. Cl.
CPC .......... *G06Q 40/08* (2013.01); *G06V 20/176* (2022.01); *G06F 2218/12* (2023.01); *G06Q 40/00* (2013.01); *G06Q 2220/00* (2013.01)

(56) References Cited

U.S. PATENT DOCUMENTS

| | | | |
|---|---|---|---|
| 5,325,291 A | | 6/1994 | Garrett et al. |
| 5,453,618 A | * | 9/1995 | Sutton ............... H04N 3/09 348/E3.01 |
| 5,526,609 A | | 6/1996 | Lee et al. |
| 5,557,260 A | * | 9/1996 | Legaz ............... G08B 17/12 340/556 |
| 5,592,151 A | * | 1/1997 | Rolih ............... G08B 17/12 396/428 |
| 5,724,261 A | | 3/1998 | Denny et al. |
| 5,950,169 A | | 9/1999 | Borghesi et al. |
| 5,959,589 A | * | 9/1999 | Sadovnik ............ H01Q 25/00 343/765 |
| 5,960,338 A | | 9/1999 | Foti |
| 5,991,733 A | | 11/1999 | Aleia et al. |
| 6,029,141 A | | 2/2000 | Bezos et al. |
| 6,049,773 A | | 4/2000 | McCormack et al. |
| 6,141,686 A | | 10/2000 | Jackowski et al. |
| 6,526,807 B1 | | 3/2003 | Doumit et al. |
| 6,686,838 B1 | | 2/2004 | Rezvani et al. |
| 6,766,322 B1 | | 7/2004 | Bell |
| 6,826,607 B1 | | 11/2004 | Gelvin et al. |
| 6,985,907 B2 | | 1/2006 | Zambo et al. |
| 7,015,789 B1 | | 3/2006 | Helgeson |
| 7,138,914 B2 | | 11/2006 | Culpepper et al. |
| 7,142,099 B2 | | 11/2006 | Ross et al. |
| 7,170,418 B2 | | 1/2007 | Rose-Pehrsson et al. |
| 7,203,654 B2 | | 4/2007 | Menendez |
| 7,398,218 B1 | | 7/2008 | Bernaski et al. |
| 7,406,436 B1 | | 7/2008 | Reisman |
| 7,602,196 B2 | | 10/2009 | Vokey |
| 7,610,210 B2 | | 10/2009 | Helitzer et al. |
| 7,624,031 B2 | | 11/2009 | Simpson et al. |
| 7,624,069 B2 | | 11/2009 | Padgette |
| 7,711,584 B2 | | 5/2010 | Helitzer et al. |
| 7,716,076 B1 | | 5/2010 | Block et al. |
| 7,739,133 B1 | | 6/2010 | Hail et al. |
| 7,809,587 B2 | | 10/2010 | Dorai et al. |
| 7,869,944 B2 | | 1/2011 | Deaton et al. |
| 7,885,831 B2 | | 2/2011 | Burton et al. |
| 7,899,560 B2 | | 3/2011 | Eck |
| 7,937,437 B2 | | 5/2011 | Fujii |
| 7,945,497 B2 | | 5/2011 | Kenefick et al. |
| 7,949,548 B2 | | 5/2011 | Mathai et al. |
| 7,958,184 B2 | | 6/2011 | Barsness et al. |
| 7,969,296 B1 | | 6/2011 | Stell |
| 8,004,404 B2 | | 8/2011 | Izumi et al. |
| 8,041,636 B1 | | 10/2011 | Hunter et al. |
| 8,046,243 B2 | | 10/2011 | Winkler |
| 8,069,181 B1 | | 11/2011 | Krishnan et al. |
| 8,081,795 B2 | | 12/2011 | Brown |
| 8,086,523 B1 | | 12/2011 | Palmer |
| 8,090,598 B2 | | 1/2012 | Bauer et al. |
| 8,095,394 B2 | | 1/2012 | Nowak et al. |
| 8,103,527 B1 | | 1/2012 | Lasalle et al. |
| 8,106,769 B1 | | 1/2012 | Maroney et al. |
| 8,229,767 B2 | | 7/2012 | Birchall |
| 8,249,968 B1 | | 8/2012 | Oldham et al. |
| 8,265,963 B1 | | 9/2012 | Janson et al. |
| 8,271,303 B2 | | 9/2012 | Helitzer et al. |
| 8,271,308 B2 | | 9/2012 | Winkler |
| 8,271,321 B1 | | 9/2012 | Kestenbaum |
| 8,289,160 B1 | | 10/2012 | Billman |
| 8,294,567 B1 | | 10/2012 | Stell |
| 8,306,258 B2 | | 11/2012 | Brown |
| 8,332,242 B1 | | 12/2012 | Medina, III |
| 8,332,348 B1 | | 12/2012 | Avery |
| 8,369,567 B1 | * | 2/2013 | Buck ............... G06V 20/13 382/165 |
| 8,384,538 B2 | | 2/2013 | Breed |
| 8,400,299 B1 | | 3/2013 | Maroney et al. |
| 8,428,972 B1 | | 4/2013 | Noles et al. |
| 8,452,678 B2 | | 5/2013 | Feldman et al. |
| 8,510,196 B1 | | 8/2013 | Brandmaier et al. |
| 8,515,788 B1 | | 8/2013 | Tracy et al. |
| 8,521,542 B1 | | 8/2013 | Stotts |
| 8,527,306 B1 | | 9/2013 | Reeser et al. |
| 8,600,104 B2 | | 12/2013 | Brown |
| 8,635,091 B2 | | 1/2014 | Amigo et al. |
| 8,638,228 B2 | | 1/2014 | Amigo et al. |
| 8,650,048 B1 | | 2/2014 | Hopkins, III et al. |
| 8,676,612 B2 | | 3/2014 | Helitzer et al. |
| 8,719,061 B2 | | 5/2014 | Birchall |
| 8,731,975 B2 | | 5/2014 | English et al. |
| 8,760,285 B2 | | 6/2014 | Billman et al. |
| 8,774,525 B2 | | 7/2014 | Pershing |
| 8,782,395 B1 | | 7/2014 | Ly |
| 8,788,299 B1 | | 7/2014 | Medina, III |
| 8,788,301 B1 | | 7/2014 | Marlow et al. |
| 8,799,034 B1 | | 8/2014 | Brandmaier et al. |
| 8,812,414 B2 | | 8/2014 | Arthur et al. |
| 8,813,065 B2 | | 8/2014 | Zygmuntowicz et al. |
| 8,868,541 B2 | | 10/2014 | Lin et al. |
| 8,872,818 B2 | | 10/2014 | Freeman et al. |
| 8,910,298 B2 | | 12/2014 | Gettings et al. |
| 8,924,241 B2 | | 12/2014 | Grosso |
| 8,930,269 B2 | | 1/2015 | He et al. |
| 8,930,581 B2 | | 1/2015 | Anton et al. |
| 8,981,942 B2 | | 3/2015 | He et al. |
| 9,015,238 B1 | | 4/2015 | Anton et al. |
| 9,049,168 B2 | | 6/2015 | Jacob et al. |
| 9,053,516 B2 | | 6/2015 | Stempora |
| 9,082,015 B2 | | 7/2015 | Christopulos et al. |
| 9,141,995 B1 | | 9/2015 | Brinkmann et al. |
| 9,158,869 B2 | | 10/2015 | Labrie et al. |

(56) References Cited

U.S. PATENT DOCUMENTS

| | | | |
|---|---|---|---|
| 9,165,084 B2 | 10/2015 | Isberg et al. | |
| 9,183,560 B2 | 11/2015 | Abelow | |
| 9,252,980 B2 | 2/2016 | Raman | |
| 9,311,676 B2 | 4/2016 | Helitzer et al. | |
| 9,330,550 B2 | 5/2016 | Zribi et al. | |
| 9,363,322 B1 | 6/2016 | Anton et al. | |
| 9,454,907 B2 | 9/2016 | Hafeez et al. | |
| 9,460,471 B2 | 10/2016 | Bernard et al. | |
| 9,481,459 B2 | 11/2016 | Staskevich et al. | |
| 9,611,038 B2 | 4/2017 | Dahlstrom | |
| 9,613,523 B2 | 4/2017 | Davidson et al. | |
| 9,652,805 B1 | 5/2017 | Clawson, II et al. | |
| 9,665,074 B2 | 5/2017 | Lentzitzky | |
| 9,710,858 B1 | 7/2017 | Devereaux et al. | |
| 9,734,685 B2 | 8/2017 | Fields et al. | |
| 9,747,571 B2 | 8/2017 | Ballew et al. | |
| 9,754,325 B1 | 9/2017 | Konrardy et al. | |
| 9,792,656 B1 | 10/2017 | Konrardy et al. | |
| 9,811,862 B1 | 11/2017 | Allen et al. | |
| 9,818,158 B1 | 11/2017 | Devereaux et al. | |
| 9,842,310 B2 | 12/2017 | Lekas | |
| 9,886,723 B1 | 2/2018 | Devereaux et al. | |
| 9,892,463 B1 | 2/2018 | Hakimi-Boushehri et al. | |
| 9,934,675 B2 | 4/2018 | Coyne et al. | |
| 9,947,051 B1 | 4/2018 | Allen et al. | |
| 9,959,581 B2 | 5/2018 | Pershing | |
| 9,984,417 B1 | 5/2018 | Allen et al. | |
| 10,032,224 B2 | 7/2018 | Helitzer et al. | |
| 10,055,793 B1 | 8/2018 | Call et al. | |
| 10,055,794 B1 | 8/2018 | Konrardy et al. | |
| 10,121,207 B1 | 11/2018 | Devereaux et al. | |
| 10,163,162 B1 | 12/2018 | Devereaux et al. | |
| 10,181,159 B1 | 1/2019 | Allen et al. | |
| 10,552,911 B1 | 2/2020 | Allen et al. | |
| 2002/0007289 A1 | 1/2002 | Malin et al. | |
| 2002/0032586 A1 | 3/2002 | Joao | |
| 2002/0035528 A1 | 3/2002 | Simpson et al. | |
| 2002/0049618 A1 | 4/2002 | McClure et al. | |
| 2002/0055861 A1 | 5/2002 | King et al. | |
| 2002/0087364 A1 | 7/2002 | Lerner et al. | |
| 2002/0103622 A1 | 8/2002 | Burge | |
| 2002/0111835 A1 | 8/2002 | Hele et al. | |
| 2002/0116254 A1 | 8/2002 | Stein et al. | |
| 2002/0129001 A1 | 9/2002 | Levkoff et al. | |
| 2002/0139056 A1* | 10/2002 | Finnell | A62C 3/0214 52/168 |
| 2002/0178033 A1 | 11/2002 | Yoshioka et al. | |
| 2003/0040934 A1 | 2/2003 | Skidmore et al. | |
| 2003/0078816 A1 | 4/2003 | Filep | |
| 2003/0097335 A1 | 5/2003 | Moskowitz et al. | |
| 2003/0182441 A1 | 9/2003 | Andrew et al. | |
| 2004/0019507 A1 | 1/2004 | Yaruss et al. | |
| 2004/0034657 A1 | 2/2004 | Zambo et al. | |
| 2004/0039586 A1 | 2/2004 | Garvey et al. | |
| 2004/0046033 A1 | 3/2004 | Kolodziej et al. | |
| 2004/0064345 A1 | 4/2004 | Ajamian et al. | |
| 2004/0172304 A1 | 9/2004 | Joao | |
| 2004/0181621 A1 | 9/2004 | Mathur et al. | |
| 2004/0183904 A1* | 9/2004 | Johnson | G08B 17/12 340/584 |
| 2004/0260406 A1 | 12/2004 | Ljunggren et al. | |
| 2005/0050017 A1 | 3/2005 | Ross et al. | |
| 2005/0055248 A1 | 3/2005 | Helitzer et al. | |
| 2005/0055249 A1 | 3/2005 | Helitzer et al. | |
| 2005/0057365 A1 | 3/2005 | Qualey | |
| 2005/0128074 A1 | 6/2005 | Culpepper et al. | |
| 2005/0197847 A1 | 9/2005 | Smith | |
| 2005/0226273 A1 | 10/2005 | Qian | |
| 2005/0251427 A1 | 11/2005 | Dorai et al. | |
| 2005/0276401 A1 | 12/2005 | Madill, Jr. et al. | |
| 2005/0278082 A1* | 12/2005 | Weekes | G07C 5/008 701/1 |
| 2006/0017558 A1 | 1/2006 | Albert et al. | |
| 2006/0026044 A1 | 2/2006 | Smith | |
| 2006/0052905 A1 | 3/2006 | Pfingsten et al. | |
| 2006/0111874 A1 | 5/2006 | Curtis et al. | |
| 2006/0200008 A1 | 9/2006 | Moore-Ede | |
| 2006/0218018 A1 | 9/2006 | Schmitt | |
| 2006/0219705 A1 | 10/2006 | Beier et al. | |
| 2006/0229923 A1 | 10/2006 | Adi et al. | |
| 2006/0235611 A1 | 10/2006 | Deaton et al. | |
| 2006/0270421 A1* | 11/2006 | Phillips | G08B 21/0269 455/457 |
| 2007/0000317 A1* | 1/2007 | Berti | G08B 17/005 73/170.16 |
| 2007/0005400 A1 | 1/2007 | Eggenberger et al. | |
| 2007/0005404 A1 | 1/2007 | Raz et al. | |
| 2007/0043803 A1 | 2/2007 | Whitehouse et al. | |
| 2007/0088579 A1 | 4/2007 | Richards | |
| 2007/0100669 A1 | 5/2007 | Wargin et al. | |
| 2007/0118399 A1 | 5/2007 | Avinash et al. | |
| 2007/0136077 A1* | 6/2007 | Hammond | G06Q 30/0278 705/306 |
| 2007/0136078 A1 | 6/2007 | Plante | |
| 2007/0150319 A1 | 6/2007 | Menendez | |
| 2007/0156463 A1 | 7/2007 | Burton et al. | |
| 2007/0161940 A1 | 7/2007 | Blanchard et al. | |
| 2007/0174467 A1 | 7/2007 | Ballou et al. | |
| 2007/0214023 A1 | 9/2007 | Mathai et al. | |
| 2007/0226072 A1* | 9/2007 | Gross | G06Q 30/0641 705/4 |
| 2007/0282639 A1 | 12/2007 | Leszuk et al. | |
| 2007/0299677 A1 | 12/2007 | Maertz | |
| 2008/0033847 A1 | 2/2008 | McIntosh | |
| 2008/0052134 A1 | 2/2008 | Nowak et al. | |
| 2008/0065427 A1 | 3/2008 | Helitzer et al. | |
| 2008/0077451 A1 | 3/2008 | Anthony et al. | |
| 2008/0086320 A1 | 4/2008 | Ballew et al. | |
| 2008/0114655 A1 | 5/2008 | Skidmore | |
| 2008/0140857 A1 | 6/2008 | Conner et al. | |
| 2008/0154651 A1 | 6/2008 | Kenefick et al. | |
| 2008/0154686 A1 | 6/2008 | Vicino | |
| 2008/0154851 A1 | 6/2008 | Jean | |
| 2008/0154886 A1 | 6/2008 | Podowski et al. | |
| 2008/0164769 A1 | 7/2008 | Eck | |
| 2008/0189142 A1* | 8/2008 | Brown | G06Q 10/00 705/325 |
| 2008/0243558 A1 | 10/2008 | Gupte | |
| 2008/0244329 A1 | 10/2008 | Shinbo et al. | |
| 2008/0282817 A1 | 11/2008 | Breed | |
| 2008/0306799 A1 | 12/2008 | Sopko et al. | |
| 2008/0307104 A1 | 12/2008 | Amini et al. | |
| 2008/0319787 A1 | 12/2008 | Stivoric et al. | |
| 2009/0006175 A1 | 1/2009 | Maertz | |
| 2009/0024420 A1 | 1/2009 | Winkler | |
| 2009/0031175 A1 | 1/2009 | Aggarwal et al. | |
| 2009/0109037 A1 | 4/2009 | Farmer | |
| 2009/0119132 A1 | 5/2009 | Bolano et al. | |
| 2009/0135009 A1 | 5/2009 | Little et al. | |
| 2009/0177500 A1 | 7/2009 | Swahn | |
| 2009/0188202 A1 | 7/2009 | Vokey | |
| 2009/0205054 A1 | 8/2009 | Blotenberg et al. | |
| 2009/0216349 A1 | 8/2009 | Kwon et al. | |
| 2009/0240531 A1 | 9/2009 | Hilborn | |
| 2009/0240550 A1 | 9/2009 | McCarty | |
| 2009/0265193 A1* | 10/2009 | Collins | G06Q 30/0185 901/46 |
| 2009/0265207 A1 | 10/2009 | Johnson | |
| 2009/0266565 A1 | 10/2009 | Char | |
| 2009/0279734 A1 | 11/2009 | Brown | |
| 2009/0287509 A1 | 11/2009 | Basak et al. | |
| 2010/0030586 A1 | 2/2010 | Taylor et al. | |
| 2010/0049552 A1 | 2/2010 | Fini et al. | |
| 2010/0070097 A1* | 3/2010 | Morgenstern | A62C 35/64 700/283 |
| 2010/0131300 A1 | 5/2010 | Collopy et al. | |
| 2010/0131307 A1 | 5/2010 | Collopy et al. | |
| 2010/0174566 A1 | 7/2010 | Helitzer et al. | |
| 2010/0241464 A1 | 9/2010 | Amigo et al. | |
| 2010/0274590 A1 | 10/2010 | Compangano et al. | |
| 2010/0274859 A1 | 10/2010 | Bucuk | |
| 2010/0299161 A1 | 11/2010 | Burdick et al. | |
| 2010/0299162 A1 | 11/2010 | Kwan | |
| 2011/0043958 A1 | 2/2011 | Nakamura et al. | |

(56) References Cited

U.S. PATENT DOCUMENTS

| | | |
|---|---|---|
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1* | 6/2011 | Busque .................. G06Q 10/10 382/307 |
| 2011/0161119 A1* | 6/2011 | Collins .................. G06Q 40/08 705/4 |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |
| 2012/0158436 A1 | 6/2012 | Bauer et al. |
| 2012/0176237 A1 | 7/2012 | Tabe |
| 2012/0186691 A1* | 7/2012 | Bridges .................. A62C 35/15 141/2 |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0094699 A1* | 4/2013 | Ko .................... G06F 18/24323 382/103 |
| 2013/0144658 A1 | 6/2013 | Schnabolk et al. |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0262029 A1* | 10/2013 | Pershing .................. G06Q 40/00 702/156 |
| 2013/0268358 A1 | 10/2013 | Haas |
| 2013/0282408 A1 | 10/2013 | Snyder et al. |
| 2013/0317732 A1 | 11/2013 | Borg et al. |
| 2014/0025528 A1 | 1/2014 | Duker |
| 2014/0040343 A1 | 2/2014 | Nickolov et al. |
| 2014/0046701 A1 | 2/2014 | Steinberg et al. |
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1* | 5/2014 | Billman .................. G08B 19/00 463/31 |
| 2014/0136242 A1* | 5/2014 | Weekes .................. G06Q 40/08 705/4 |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192184 A1* | 7/2014 | Wu ..................... G08B 17/125 348/135 |
| 2014/0192646 A1 | 7/2014 | Mir et al. |
| 2014/0195272 A1 | 7/2014 | Sadiq et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0257862 A1* | 9/2014 | Billman ............... G06Q 50/163 705/4 |
| 2014/0257863 A1 | 9/2014 | Maastricht et al. |
| 2014/0266669 A1 | 9/2014 | Fadell et al. |
| 2014/0267627 A1 | 9/2014 | Freeman et al. |
| 2014/0270492 A1 | 9/2014 | Christopulos et al. |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358592 A1 | 12/2014 | Wedig et al. |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |
| 2015/0372832 A1 | 12/2015 | Kortz et al. |
| 2016/0005130 A1 | 1/2016 | Devereaux et al. |
| 2016/0012445 A1* | 1/2016 | Villa-Real ............ G06Q 20/4016 705/44 |
| 2016/0039921 A1 | 2/2016 | Luo et al. |
| 2016/0051850 A1* | 2/2016 | Menard ............... A62C 3/0214 169/16 |
| 2016/0055594 A1 | 2/2016 | Emison |
| 2016/0067547 A1 | 3/2016 | Anthony et al. |
| 2016/0104250 A1 | 4/2016 | Allen et al. |
| 2016/0125170 A1 | 5/2016 | Abramowitz |
| 2016/0151653 A1* | 6/2016 | Ge .................... G01S 17/42 169/46 |
| 2016/0163186 A1 | 6/2016 | Davidson et al. |
| 2016/0225098 A1 | 8/2016 | Helitzer et al. |
| 2017/0178424 A1 | 6/2017 | Wright |
| 2017/0275023 A1* | 9/2017 | Harris .................. H04N 13/243 |
| 2017/0365008 A1 | 12/2017 | Schreier et al. |
| 2021/0232987 A1* | 7/2021 | Nguyen ............. G06Q 10/0875 |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |

(56) References Cited

FOREIGN PATENT DOCUMENTS

| | | | |
|---|---|---|---|
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013036677 A1 | 3/2013 |

OTHER PUBLICATIONS

Support Framework for the Insurance Sector IEEE (Year: 2009).*
Red-Eye: A Helicopter-based architecture for tactical wildfire monitoring strategies, IEEE (Year: 2009).*
Automatic Detection of Animals in Mowing Operations Using Thermal Cameras, PMC (Year: 2012).*
"After an Auto Accident: Understanding the Claims Process," Financial Services Commission on Ontario, 2011, 10 pgs.
"Truck Crash Event Data Recorder Downloading," Crash Forensic; 2012, pp. 1-25.
Aiyagari, Sanjay et al., "AMQP Message Queuing Protocol Specification," Version Dec. 9, 2006. https://www.rabbitmq.com/resources/specs/amqp0-9.
Amanda Love, "How Recoverable Depreciation Works", Aug. 6, 2012, http://www.stateroofingtexas.com/recoverable-depreciation-works/.
AMQP is the Internet Protocol for Business Messaging Website. Jul. 4, 2011. https://web.archive.org/web/20110704212632/http://www.amqp.org/about/what.
Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.
Corbett et al., "Spanner: Google's Globally-Distributed Database," Google, Inc., pp. 1-14, 2012.
Das, Sudipto et al., "Ricardo: Integrating R and Hadoop," IBM Almaden Research Center, SIGMOD'10, Jun. 6-11, 2010.
Dean et al., " A New Age of Data Mining in the High-Performance World," SAS Institute Inc., 2012.
Deerwester et al., "Indexing by Latent Semantic Analysis," Journal of the American Society for Information Science, 1990.41 (6), pp. 391-407.
Farmers Next Generation Homeowners Policy, Missouri, by Farmers insurance Exchange; 2008; 50 pages.
Fong et al., "Toward a scale-out data-management middleware for low-latency enterprise computing," IBM J. Res & DEV. vol. 57, No. 3/4 Paper, 6 May/Jul. 2013.
Glennon, Jr., John C.; "Motor Vehicle Crash Investigation and Reconstruction," BSAT, 2001, 4 pgs.
Gonzalez Ribeiro, Ana, "Surprising things your home insurance covers," Jan. 12, 2012 in Insurance; 4 pages.
Hopkins, Brian, "Big Opportunities in Big Data Positioning Your Firm to Capitalize in a Sea of Information," Enterprise Architecture Professionals, Forrester Research, Inc., pp. 1-9, May 2011.
Wasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).
Kopp et al., "Full-scale testing of low-rise, residential buildings with realistic wind loads", 2012, 15 pages.
McKeown et al., "OpenFlow: Enabling Innovation in Campus Networks," pp. 1-6, Mar. 14, 2008.
Melnik, Sergey et al., "Dremel: Interactive Analysis of Web-Scale Datasets, " 36th International Conference on Very Large Data Bases, Sep. 13-17, 2010, Singapore, Proceedings of the VLDB Endowment, vol. No. 1.
NYSE Technologies Website and Fact Sheet for Data Fabric 6.0 Aug. 2011, https://web.archive.org/web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theußl, "Applied High Performance Computing Using R," Diploma Thesis, Univ. Prof, Dipl, Ing. Dr. Kurt Hornik, pp. 1-126, Sep. 27, 2007.
STIC search dated Jan. 4, 2019 (Year 2019).
Telematics Set the Stage the Improved Auto Claims Management by Sam Friedman (Oct. 10, 2012); 3 pages.
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," WORKS 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
Zevnik, Richard. The Complete Book of Insurance. Sphinx. 2004. pp. 76-78.

* cited by examiner

SYSTEMS AND METHODS FOR UTILIZING IMAGING INFORMATICS

CROSS REFERENCE TO RELATED APPLICATIONS

This application is a Continuation of U.S. patent application Ser. No. 16/230,387 filed Dec. 21, 2018, which claims priority to U.S. patent application Ser. No. 14/324,618 filed Jul. 7, 2014, which claims priority U.S. Patent Application Serial Nos. 61/866,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for imaging informatics, and more particularly, to compiling and utilizing imaging informatics in insurance processes.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Accordingly, there is an unmet need for measuring information relating to an insured risk, such as a residence or structures located on the residence premises, and utilizing that information to make appropriate modifications to insurance policy terms, such as the deductible amount.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect described is a computer device and method for processing insurance claims utilizing informatic data received from one or more informatic camera sensor devices configured to capture imagery data relating to an insured property. Analysis is performed on the received imagery informatic data to determine an assessment variable regarding the insured property. An insurance policy associated with the insured property is also received by the computer and analyzed to determine insurance coverage terms and conditions for the insured property. Predefined business rules are preferably applied by the computer using at least the determined assessment variable and the determined insurance coverage terms and conditions for the insured property to determine an event relating to the insurance policy associated with the insured property.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
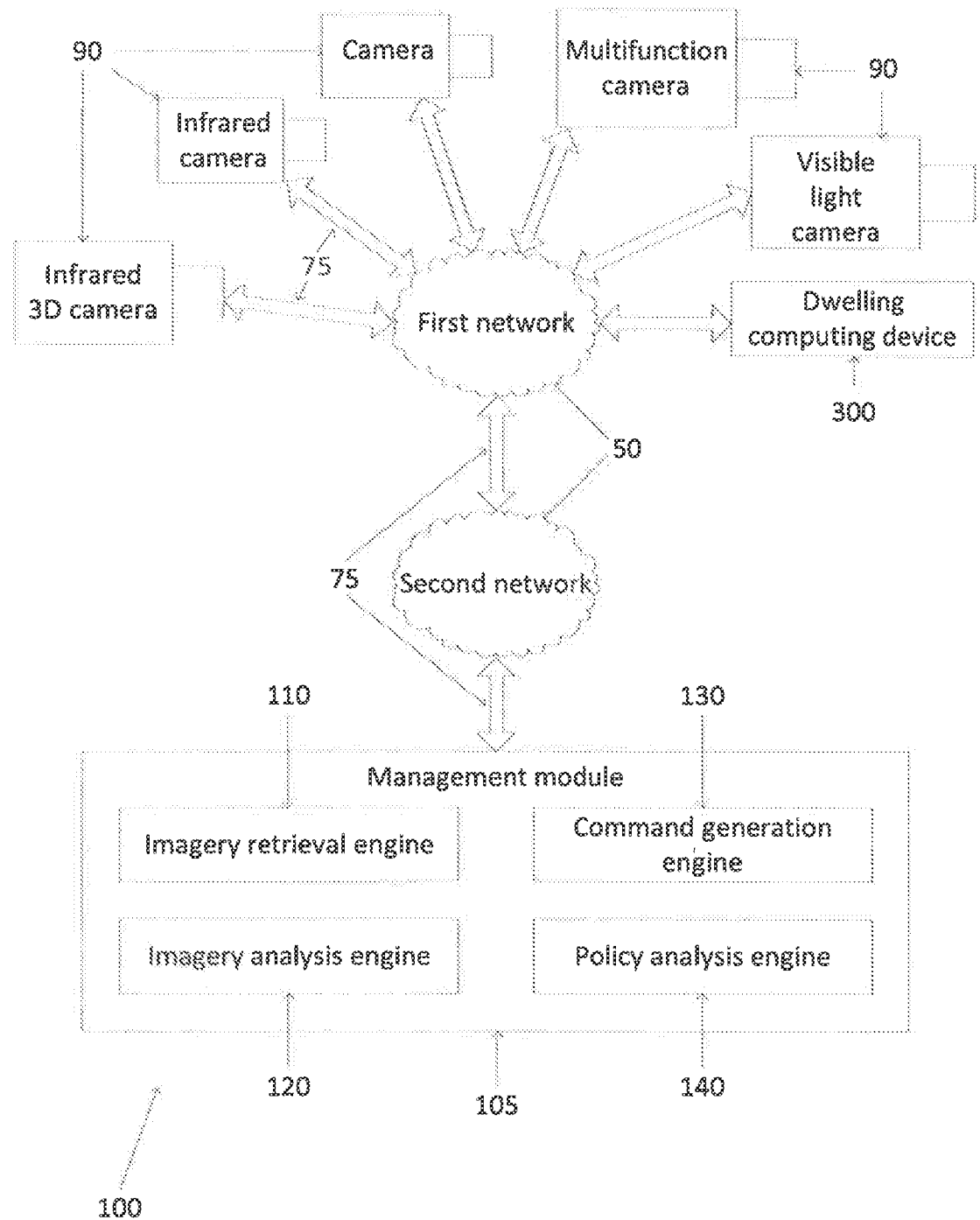
FIG. 1 illustrates an example system for gathering and utilizing imagery informatics related to an insured property.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. Commonly assigned U.S. Pat. Nos. 8,289,160 and 8,400,299 are related to certain embodiments described herein and are each incorporated herein by reference in their entirety.

As used herein, the term "risk related data" means data or information that may be relevant to an insurance company's decisions about underwriting, pricing, and other terms and conditions on which it is willing to issue insurance policies.

As used herein, the term "insurance policy" or "insurance product" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As also used herein, "insured" may refer to an applicant for a new insurance policy and/or may refer to an insured under an existing insurance policy.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, FIG. 1 depicts an exemplary system 100 communicatively connected to one or more imaging devices (e.g., camera devices) relative to an insured property in which below illustrated embodiments may be implemented. As to be further discussed below, it is to be understood examples of imaging devices include, but are not limited to, camera devices, webcams, smart tv camera devices (and other appliance camera devices), smart phone devices, tablet devices, satellite imaging devices (including high-device imaging satellite devices), infrared and/or radar devices and the like. It is to be further understood that first and second networks 50 are each a geographically distributed collections of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property, structure, residence or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Communications 75 represents computerized communications as known by those skilled in the art. For instance, communications 75 may be wired links or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. For exemplary purposes and without limitations, examples of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the server computer, partly on the server computer, as a stand-alone software package, partly on the server computer and partly on a remote computer (such as computing device 300) or entirely on the remote computer. In the latter scenario, the remote computer may be connected to the server computer through any type of network, including a local area network (LAN) or a wide area network (WAN), a combination thereof, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Turning to FIG. 1, system 100 includes cameras 90 and management module 105 that includes imagery retrieval engine 110, imagery analysis engine 120, command generation engine 130 and policy analysis engine 140. In one embodiment, first network 50 is a LAN and second network 50 is a WAN (best shown in FIG. 1), such as the internet, although it is contemplated herein that networks 50 may be any system and/or method of computerized communications as understood by those skilled in the art.

Figure 2:
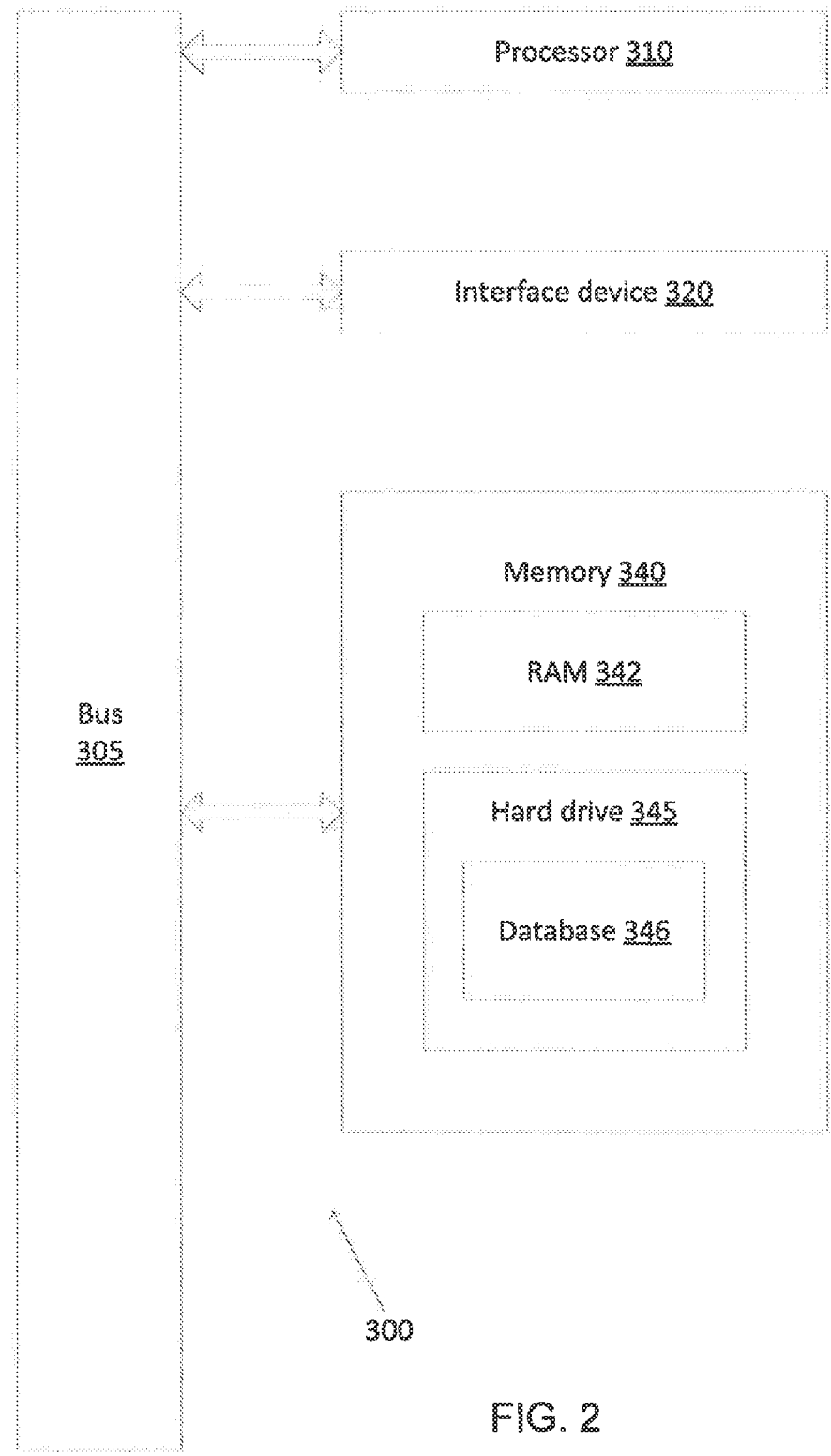
FIG. 2 illustrates a network computer device/node in accordance with an illustrated embodiment.

FIG. 2 is a schematic block diagram of an example computing device 300 that may be used (or components thereof) with one or more embodiments described herein. As explained above, in different embodiments these various devices be configured to communicate with each other in any suitable way, such as, for example, via communication 75 over networks 50.

Device 300 is only one example of a suitable system and is not intended to suggest any limitation as to the scope of use or functionality of embodiments of the invention described herein. Regardless, computing device 300 is capable of being implemented and/or performing any of the functionality set forth herein.

Computing device 300 is operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 300 may be described in the general context of computer system-executable instructions, such as program modules, being executed by a computer system. Generally, program modules may include routines, programs, objects, components, logic, data structures, and so on that perform particular tasks or implement particular abstract data types. Computing device 300 may be practiced in distributed data processing environments where tasks are performed by remote processing devices that are linked through a communications network. In a distributed data processing environment, program modules may be located in both local and remote computer system storage media including memory storage devices.

Device 300 is shown in FIG. 2 in the form of a general-purpose computing device. The components of device 300 may include, but are not limited to, one or more processors or processing units 310, a system memory 340, interface device 320, and a bus 305 that couples various system components including system memory 340 to processor 310.

Bus 305 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 300 typically includes a variety of computer system readable media. Such media may be any available media that is accessible by device 300, and it includes both volatile and non-volatile media, removable and non-removable media.

System memory 340 can include computer system readable media in the form of volatile memory, such as random access memory (RAM) 342, cache memory, and hard drive 345, which may include database 346. Computing device 300 may further include other removable/non-removable, volatile/non-volatile computer system storage media. By way of example only, hard drive 345 can be provided for reading from and writing to a non-removable, non-volatile magnetic media. Interface device 320 includes, without limitation, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 305 by one or more data media interfaces. As will be further depicted and described below, memory 340 may include at least one program product having a set (e.g., at least one) of program modules that are configured to carry out the functions of embodiments of the invention.

Management module 105, has a set (at least one) of engines, such as imagery retrieval engine 110, imagery analysis engine 120, command generation engine 130 and policy analysis engine 140 described below, may be stored in memory 340 by way of example, and not limitation, as well as an operating system, one or more application programs, other program modules, and program data. Each of the operating system, one or more application programs, other program modules, and program data or some combination thereof, may include an implementation of a networking environment. Management module 105 generally carry out the functions and/or methodologies of embodiments of the invention as described herein.

Device 300 may also communicate with one or more interface devices 320 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces. Still yet, device 300 can communicate with one or more networks such as a local area network (LAN), a general wide area network (WAN), and/or a public network (e.g., the Internet) via a network adapter 320. As depicted, network adapter 320 communicates with the other components of computing device 300 via bus 305. It should be understood that although not shown, other hardware and/or software components could be used in conjunction with device 300. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Camera 90 includes capture data related to structures. It is contemplated herein that structures include any type of insured property structure (e.g., residential, commercial, retail, municipal, etc.) in which the capture and analysis of camera data is useful for the reasons at least described herein. In one embodiment, cameras 90 communicate directly with management module 105. However, it is contemplated herein that cameras 90 may communicate with computing device 300 operating on the same network 50 (best shown in FIG. 1) as cameras 90. In this embodiment, computing device 300 receives information from cameras 90 and communicates the information to management module 105. Computing device 300 may immediately transfer the information to management module 105, it may be a delayed transfer (e.g., scheduled for the middle of the night when internet usage is low), and/or it may be any communication methodology as known by those skilled in the art. Computing device 300 is preferably configured and operational to receive (capture) data from various cameras 90 regarding certain measured aspects of the insured property and transmit that captured data to a management module 105 via network 50. It is noted that device 300 may perform analytics regarding the captured imagery regarding the insured property, and/or management module 105, preferably located or controlled by an insurance company/carrier, may perform such analytics, as also further described below. Further, cameras 90 may be connected to computing device 300 by wire, or by a wireless technology, or via any communication methodology as known by those skilled in the art.

Although various camera types are illustrated in FIG. 1 and described below, the camera types described and shown herein are not intended to be exhaustive as embodiments of the present invention may encompass any type of known or unknown camera type which facilitates the purposes and objectives of the certain illustrated embodiments described herein. It is to be understood and appreciated, in accordance with the embodiments herein, sensors/cameras 90 are preferably installed, and its data is collected, maintained, accessed and otherwise utilized pursuant to the permission of the insured(s) and subject to appropriate security and privacy protections. Exemplary camera types include but are not limited to:

Visible light two dimensional (2D) camera—Generally speaking, this is the camera that is commonly used. This type of camera produces a 2D image of the visible light received and detected by the camera.

Visible light three dimensional (3D) camera—In one embodiment, this camera comprises a pair of 2D cameras that are capturing approximately the same content, but from different perspectives. The two cameras may be the same vertical distance from the ground and a few inches apart horizontally, similar to how peoples' eyes are separated. However, it is contemplated herein that the cameras may have any arrangement, including, without limitation, only vertical differentiation, both vertical and horizontal differentiation, and/or three or more cameras. It is further contemplated herein two or more cameras may share a common lens, to the extent that such is practicable.

Infrared camera—Such a camera would record, detect, and communicate imagery of infrared emissions in its field of view. It is contemplated herein that such a camera may be specially designed to record infrared imagery, it may be a "normal" camera with a special filter designed to facilitate infrared imagery, it may be a "normal" camera re-equipped to detect infrared imagery, and/or any configuration and/or means for capturing infrared imagery as known in the art.

Infrared 3D camera—Typically consist of a combination of cameras configured to detect infrared emissions, that are typically, although not necessarily, operated in tandem and/or cooperation. As with visible light 3D cameras, the infrared 3D cameras may be arranged in any positions as known and/or practiced by those skilled in the art.

Multi-function camera—A camera, as the name suggests, configured to perform a plurality of functions, such as, for exemplary purposes only and without limitation, a 2D visible light camera and a 2D infrared camera, a single camera that captures both visible light and infrared, a camera that captures wavelengths other than infrared and visible light, and/or any combination thereof.

Thermal cameras—

Aerial imagery camera—A camera device typically mounted on an airplane, unmanned aerial vehicle (UAV), satellite, or another device that can take pictures of the insured property from the sky. These cameras can provide a unique perspective of the insured property that a picture from the ground cannot. The angles the that are taken in this manner can include by are not limited to nadir (looking straight down at the insured property) and all sides of the insured property.

Camera images from Smartphone or other portable computer device—A camera device configured to capture metadata regarding the direction, GPS coordinate and other data elements relative to a photograph. The photograph(s) can be taken by the insured, by the insurance company or a 3d party company.

It is contemplated herein that imagery captured by cameras 90 includes, for exemplary purposes only and without limitation, still picture cameras, video cameras, filtered cameras (e.g., only certain wavelengths, such as visible light green, visible light red, certain wavelengths of non-visible light), and/or combinations thereof.

With exemplary cameras 90 identified and briefly described above, and as will be further discussed below, it is to be generally understood cameras 90 preferably record certain data parameters relating to products and services provided by an insurance carrier, such as USAA, to determine and/or utilize discovered information, such as by amending or proposing to amend the terms of an insurance policy. It is to be understood and appreciated the aforementioned cameras 90 may be configured as wired and wireless types integrated in a networked environment (e.g., WAN, LAN, WiFi, 802.11X, 3G, LTE, etc.), which may also have an associated IP address. It is to be further appreciated cameras 90 be placed anywhere in and around an insured property, including without limitation, on a structure, within the structure, on the ground, in the ground, on or in a artificial stand, and/or on or in a tree or other naturally created structures. It is additionally to be understood and appreciated that cameras 90 can be networked into a central computer hub (e.g., device 300) in an insured property to aggregate collected data packets or cameras 90 may be communicatively connected to other cameras 90 and/or computing device 300 (e.g., hard-wired to either). Aggregated data packets can be analyzed in either a computer system (e.g., computing device 300) or via an external computer environment (e.g., management module 105). Additionally, it is to be understood data packets collected from cameras 90 can be aggregated in computing device 300 and sent as an aggregated packet to management module 105 for subsequent analysis whereby data packets may be transmitted at prescribed time intervals (e.g., a benefit is to reduce cellular charges in that some insured properties may not have Internet access or to send during low internet usage hours).

In accordance with an illustrated embodiment, in addition to the aforementioned, computing device 300 may additionally be coupled to a clock which may keep track of time for cameras 90, thereby allowing a given item of data to be associated with the time at which the data was captured. For example, camera 90 may recurrently capture readings of temperature, wind speed, humidity, appliance operating times, etc., and may timestamp each reading. The time at which the readings are taken may be used to reconstruct events or for other analytic purposes, such as those described herein. For example, the timestamps on wind speed readings taken during a hurricane may allow it to be determined, after the hurricane has occurred, how quickly the wind speed rose in the vicinity of the structure.

A storage component may further be provided and utilized to store data readings and/or timestamps in cameras 90. For example, a storage component may include, or may otherwise make use of, magnetic or optical disks, volatile random-access memory, non-volatile random-access memory, or any other type of storage device. There may be sufficient data storage capacity to store several hours or several weeks of data readings. For example, the severe part of a hurricane might last for half a day, a full day, or several days. A storage component might have sufficient storage capacity to allow twelve or more hours of readings to be stored, thereby allowing forensic reconstruction of how the hurricane affected the structure during the full time that the structure was experiencing the hurricane's impact.

A communication component may further be provided and utilized to communicate recorded information from computing device 300 to an external location, such as management module 105, which may be associated with an insurance carrier such as USAA. The communication component may be, or may comprise, a network communication card such as an Ethernet card, a WiFi card, or any other communication mechanism. However, the communication component could take any form and is not limited to these examples. The communication component might encrypt data that it communicates, in order to protect the security and/or privacy of the data. Additionally, data from cameras 90, a computerized clock and/or a storage component may be communicated directly to management module 105, via network 50, thus obviating or mitigating the need for computing device 300.

Management module 105 may include, or otherwise may cooperate with, imagery retrieval engine 110. Imagery retrieval engine 110 receives information from cameras 90 and/or computing device 300. In one embodiment, imagery retrieval engine 110 sends a query to computing device 300 to respond with data generated by cameras 90. In another embodiment, cameras retrieval engine 110 sends a query to cameras 90 to retrieve data they generated. In yet another embodiment, cameras 90 send data to imagery retrieval engine 110 as the data is generated. In still another embodiment, cameras 90 store data and periodically (e.g., every night at 3:00 A.M.) send to cameras retrieval engine 110. However, such is not an exhaustive list of methods of communicating data from cameras 90 to imagery retrieval engine 110, and it is contemplated herein that data may be sent in any way as known in the art, including permutations of methods described herein.

In one embodiment a single instance of management module 105 receives communications from cameras 90 at a plurality of structures/locations (e.g., thousands of camera locations either from aerial photography or from the ground communicating to a single management module 105), however it is contemplated herein that any permutation of camera(s) 90 and management module(s) 105 may be utilized as would be readily understood by those skilled in the art.

Management module 105 may further include imagery analysis engine 120 that analyzes data that has been generated by cameras 90. Imagery analysis engine 120 may utilize received imagery to determine conditions that exist at the insured property, changes to conditions, hazards to the insured property, material recognition, object recognition, and/or, possibly with the cooperation of policy analysis engine 140, compare the determined conditions to an insurance policy.

In one embodiment, imagery is gathered by cameras 90. Such cameras may detect visible and/or infrared light, may record 2D or 3D imagery, and may record thermal imagery. Further, it is contemplated herein that an already installed camera that has been redesigned and/or reconfigured to function with the embodiments described herein.

In another embodiment, the imagery is analyzed to determine if vandalism has occurred. This analysis may include identifying a change of color between a recent image and an image previously taken. Or the analysis may include identifying a change in the moisture level using thermal imagery. This analysis may also include identifying a change to the structure (e.g., a hole in a wall), which may include merely analysis of 2D imagery, may include analysis of 3D imagery, and/or it may include analysis of thermal imagery.

In yet another embodiment, the imagery is analyzed to determine if an alteration has been made to the property. The alteration detected may include replacing/adding/removing an appliance, adding/renovating a room, and/or enlarging a room. The alteration may also include damage, such as damage caused by a weather event. The damage caused by a weather invent may include damage to a structure (e.g. window knocked out or cracked, roof torn apart, a wall with a hole, a wall that has been knocked over, and damage to a wall). The analysis may be conducted by viewing a single image, thermal image, by viewing several images taken approximately contemporaneously, comparing image(s) to previous images to detect changes, comparing image(s) to the terms of an existing insurance policy, and comparing image(s) to the terms of an application for an insurance policy.

In one or more embodiment, multiple pictures may be taken and stored for any period of time, up to and including permanent storage.

In another embodiment, imagery is analyzed through object recognition to determine a value for an object in the imagery (e.g., the value of a piece of jewelry, the value of an appliance, such as a TV). The visually appraised value may be compared to previous imagery of that object, such as to detect a change in "current" value. The visually appraised value may be compared to the terms of an insurance policy, and/or the visually appraised value may be compared to an application for an insurance policy. For exemplary purposes only, imagery may utilized to detect and calculate the visually appraised value for one or more objects in a structure (up to and including all objects in the structure), compare the visually appraised value(s) to the terms of an insurance policy, and potentially send a notification if the visually appraised values exceed the terms of the insurance policy. Similarly, a notification may be sent if the visually appraised value exceeds the terms in an application for an insurance policy.

In another example, the camera images of the insured property, gathered either on the ground by the insured, the insurance company, or a $3^{rd}$ party or taken through aerial imagery can use object recognition to categorize the insured property characteristics to visually appraise or estimate the replacement rebuild cost or market value of the insured property. The visual appraisal or estimate of the replacement rebuild cost or market value of the insured property can be without objects/items within the property or with objects/items within the property. The corresponding analysis and comparison to insurance terms and conditions may indicate whether to send a notification to the insured so that the insurance amount can be adjusted. The insurance company can also use this information captured to automatically adjust the insurance amount either at the policy issue, when the image is gathered, when the image is provided to the insurance company, or at the next policy renewal, as permitted by the policy's terms and conditions.

In still another embodiment, the imagery may be analyzed to determine a number of occupants of the residence and/or the habits and activities of occupants in an insured property. For example, the imagery may be focused on identifying when certain individuals leave an insured property, and these times could be correlated with the time of the day (e.g., if a person arrives before midnight and leaves after 5 A.M., they may be presumed to have slept there). Continuing this example, the system may count how often certain individuals sleep at the insured property, and compare that to a threshold (e.g., 10 times in a month, 30 times in a 3-month period, 100 times in a year). Still continuing this example, rather than identify specific individuals, the system may merely track the number of people who sleep in the insured property, and based on that information determine how many occupants reside in the insured property.

In another example, the imagery may be focused on determining the number of hours individuals are in the insured property (whether it be daytime or nighttime), and based on that information determine how many occupants reside there. Similar to the other example, the analysis may be focused on distinguishing between people to identify who is within the insured property, or the analysis may be focused on merely counting how many people are within the insured property.

Continuing with this embodiment, the occupant count may be compared against an insurance policy and/or an application for the same. Based on the comparison, a notification may be sent (e.g., if the policy describes three occupants, but there appear to be nine occupants, then a notification may be sent to the insurer). Further, it is contemplated herein that "occupants" may include people and/or pets.

In even another embodiment, the location of a heat source (e.g., candle, toaster oven, oven, stove, hot plate, electric kettle, space heater, water heater, appliance, electric charger) may be determined, such as by analyzing a 3D infrared image and/or by analyzing one or more infrared images. In one example, the temperature of a nearby item (e.g., wooden shelf) is measured when the heat source is not activated (e.g., unlit candle, room temperature oven, stove, hot plate, kettle, heater, appliance, electric charger). Subsequently, when the heat source is activated, the temperature of the nearby item is again measured. Based on a comparison between the two temperature measurements, a notification may be sent. Alternatively, a notification may be sent based on solely the temperature of the item when the heat source is activated. In yet another alternative, a notification may be sent based on a combination of the comparison and the second temperature.

In another embodiment, a distance between a heat source and an object is determined, and based on a comparison of the distance and a predetermined threshold (e.g., two feet) a notification may be sent. Alternatively, the predetermined threshold distance may be associated with the temperature of the heat source (e.g., 200 degrees means the threshold is one foot, 250 degrees means the threshold is two feet). Continuing with this alternative, the threshold distance may be based on (1) the temperature of the heat source, and (2) the flammability of the nearby object (e.g., the threshold distance is three feet for 200 degrees and if the nearby object is paper, and the threshold distance is one foot for 200 degrees and if the nearby object is metal).

It is contemplated that the location of any object, heat source or otherwise, may be calculated based on imagery such as, for exemplary purposes only and without limitation, a 3D image, one or more images (visible light, infrared, or otherwise). Thus, for example, the distance between a heat source and an object may be calculated based on first identifying/calculating the location of both the heat source and the object.

It another embodiment, a heat source is identified. For example, if an object is a higher temperature than surrounding objects, and a meaningful temperature differential is maintained, imagery analysis engine 120 may identify the object as a heat source. Further, if the heat source is moved, imagery analysis engine 120 may identify a new location for the heat source. Along those lines, and continuing the example, if the heat source is moved closer to an object, or if an object is moved closer to a heat source, system 100 may compare a predetermined threshold to the new distance between the heat source and the object, and, based on the comparison, send a notification. The notification may include, for exemplary purposes only and without limitation, an alert to a person associated with the structure (e.g., owner and/or resident), an alert to the insurance company that unsafe conditions may exist, and/or a combination thereof.

Another embodiment may include using an analysis engine 120 associated with the camera images of the inside or outside the insured property that can recognize risks in the exterior or interior of the home. When these are identified the insurance company can provide advice and mitigation opportunities to the insured so that the risk of damage is reduced. For example, the camera image can identify that the insured has a tree branch touching the roof which can cause the roof to wear quickly when the branch moves and rubs against the roof. The analysis engine 120 could identify this and the insured would be notified that there is a risk and how to correct the risk. The camera images collected in the analysis engine 120 could also be used for acceptability, underwriting, and pricing.

In another embodiment the camera could be fixed to an airplane, UAV, satellite or another device that will allow images from the sky above the home. These images can capture roof geometry, roof material, exterior siding material and other features about the home. These images can be used to establish how much to insure the home for, risks associated and more. The camera images from above the home can identify risks or loss information like hail damage to the roof and allow the transmission of this information to the insurance company. The insurance company can use this information, like whether the home has previous hail damage to the roof, to help determine if the property meets applicable underwriting and acceptability guidelines.

Another embodiment could include the insured, insurance company, or a $3^{rd}$ party company taking pictures of the insured property using a Smartphone or other camera device configured to capture metadata like for example the GPS coordinate, beacon location, distance from a fiducially marker, direction, etc. A fiducial marker can be used by the insured, insurance company, or 3rd party to accurately measure the distance and dimensions captured in the image. The insurance company can use the camera images captured to create a digital blueprint of the home. This digital blueprint can be used to create a graphical representation of the home for use by the insurance company. It can be used to display the digital blueprint to the insured on the company's website or other portals to the insured. The digital blueprint can also be saved to help with claims handling if there is a claim on the home. The insurance company can look at the pictures and location of objects in the home and know what the pre-loss status of the home was so that the insurance company can help the insured restore the home to pre-loss status in the event of a covered loss. Another use of the camera images for the digital blueprint can be to determine an insurance amount or rebuild costs for the insured property. The camera images can have object recognition capabilities and know whether the countertop is, for example, granite or concrete and use this information to establish an insurance amount or rebuild costs.

In yet another embodiment, the insured, insurance company, and/or $3^{rd}$ party can capture images regarding the insured property and provide it to another party for the insured's benefit. For example, the insured may desire to replace carpet with hardwood flooring. Thus the insured may utilize the image collected about the insured's property that contains dimensions of the rooms and send it to a seller of hardwood flooring. The seller can then provide a quote for the flooring based upon these images using the dimension data in the images.

Management module 105 may further include command generation engine 130. Command generation engine 130 may send commands to cameras 90. Such commands may be sent through intermediary computing device 300, or such commands may be sent directly to cameras 90. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g, every day rather than every hour), an instruction to change the location and/or shooting angle of camera 90, and/or any permutations or derivations thereof as will be known by those skilled in the art.

Management module 105 may further include policy analysis engine 140. Policy analysis engine 140 may analyze the data such as described above with respect to imagery analysis engine 120. It is contemplated herein that imagery analysis engine 120 and policy analysis engine 140 may work in cooperation/tandem, independently of each other, without interaction with the other, or any other permutations or derivations thereof as will be known by those skilled in the art. Policy analysis engine may electronically seek, and receive, an insurance policy associated with an insured property to preferably apply business rules to determine/interpolate one or more terms of a policy, the terms including, for exemplary purposes only and without limitation, a coverage amount of the policy, a time period for the policy, and an identification of items and/or structures covered by the policy to preferably be utilized to determine an event relating to the insurance policy associated with the insured property based upon data captured from one or more aforesaid sensors. Examples of an event include, but are not to be limited to, adjusting one or more terms of the insurance policy, determine the value of a item or its replacement cost, determine occurrence of an insurance loss/claim event, insurance underwriting decisions and the like.

In one embodiment, policy analysis engine 140 accesses a database that contains information about insurance policies and/or applications for insurance policies. However, it is contemplated herein that policy analysis engine 140 may access/retrieve/receive said information by any means as known by those skilled in the art.

In another embodiment, policy analysis engine 140 is responsible for some (including, in some embodiments, all) of the comparison between insurance information and information gleaned from imagery.

Figure 3:
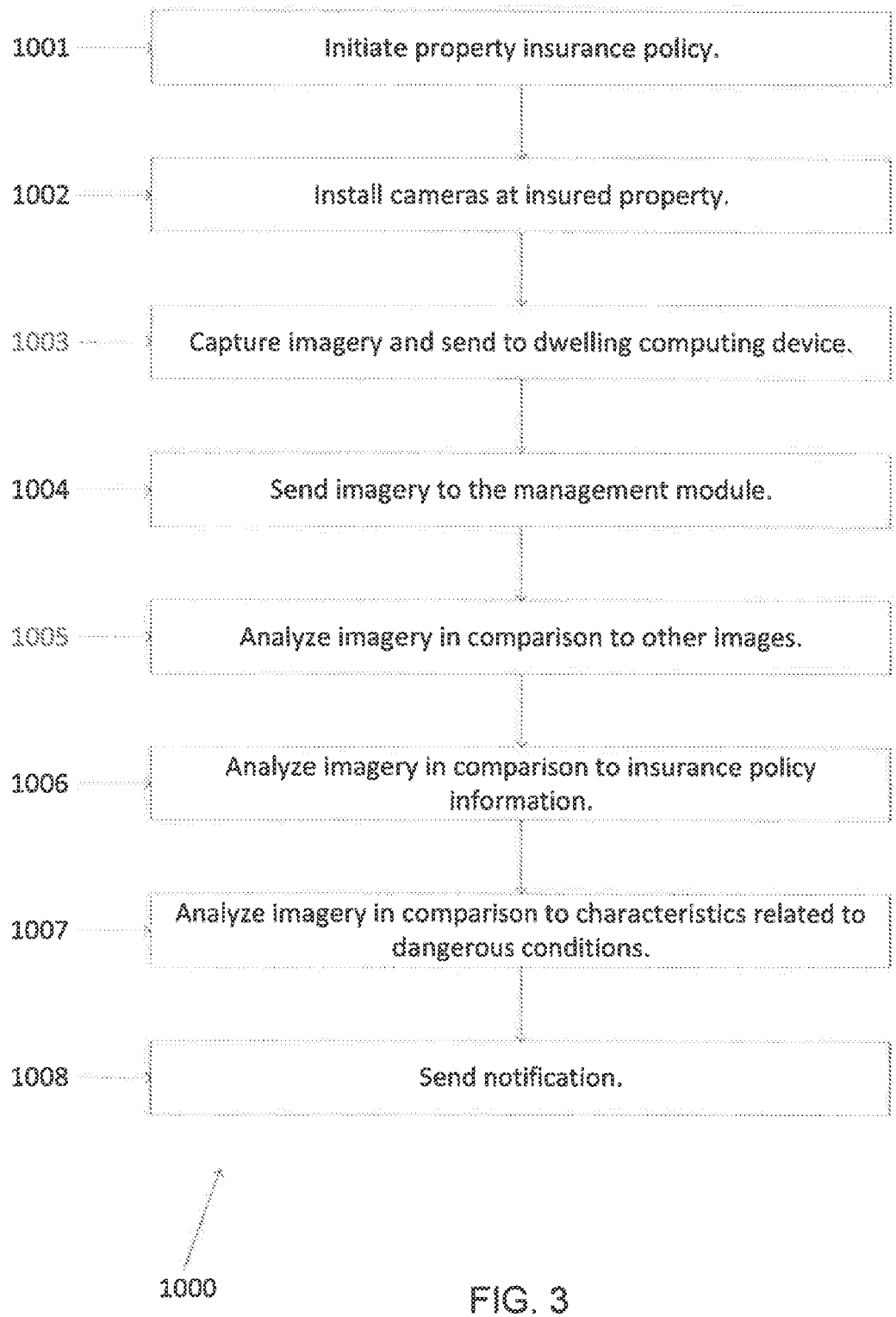
FIGS. 3 and 4 are flow diagrams of operational steps of the imagery informatics module of FIG. 1.

FIG. 3 shows, in the form of a flow chart (process 1000), exemplary operational steps of utilizing system 100. Before turning to descriptions of FIG. 3, it is noted that the flow diagram shown therein are described, by way of example, with reference to components shown in FIGS. 1-2, although these operational steps may be carried out in any system and are not limited to the scenario shown in the aforementioned figures. Additionally, the flow diagrams in FIG. 3 shows an example in which operational steps are carried out in a particular order, as indicated by the lines connecting the blocks, but the various steps shown in these diagrams can be performed in any order, or in any combination or sub-combination.

With reference to FIG. 3, starting at step 1001, a property insurance policy is initiated. This policy may be stored in memory 340, such as database 346. In one embodiment, policy analysis engine 140 has access to the policy, such as to the terms of the policy (e.g., premium, deductible, coverage amount, coverage type).

Cameras 90 are installed at a property, such as a structure, covered by the insurance policy (step 1002). In one embodiment, cameras 90 may have been previously installed for other reasons (e.g., security cameras) and later re-configured to integrate with system 100. In another embodiment, cameras 90 are installed for at least the reason of integrating with and working with system 100. In still another embodiment, cameras 90 include a combination of pre-installed cameras 90 and newly-installed cameras 90.

Subsequently, information, such as imagery, is received from cameras 90 (step 1003). As discussed above, information may be sent from cameras 90 to computing device 300, and subsequently to management module 105 (step 1004). In another embodiment, computing device 300 is not installed onsite and cameras 90 communicate directly to management module 105. In yet another embodiment, computing device 300 is installed onsite, and cameras 90 communicate directly to management module 105, cameras 90 communicate to management module 105 through computing device 300, and/or a combination thereof.

Information is analyzed by management module (step 1005), such as by imagery analysis engine 120 and/or policy analysis engine 140. The situations may be compared to insurance policy information as provided by policy analysis engine 140 (step 1006). In one embodiment, imagery analysis engine 120 considers the images and identifies prospective situations such as described herein (step 1007). Finally, based on the comparisons and/or analysis, notifications may be sent (step 1008).

In one embodiment, command generation engine 130 may send additional commands to cameras 90 and/or computing device 300, such as via computing device 300 and/or directly to cameras 90. These commands may alter the types of imagery being taken/recorded, the frequency of image captures, the speed/frequency in which images are communicated from cameras 90, and/or any other settings. Subsequent to additional commands being sent to cameras 90, cameras 90 and/or computing device 300 execute and/or perform the additional commands and send additional information to management module 105. The additional information may be analyzed independent of the previously received information, and/or it may be analyzed and/or correlated with the previously received information.

In one embodiment, information received at management module 105 is immediately analyzed and then discarded. In another embodiment the information is analyzed and stored temporarily. In yet another embodiment, the information is stored for later analysis. And in still another embodiment, the information is stored via another device/module/engine.

The term "module"/"engine" is used herein to denote a functional operation that may be embodied either as a stand-alone component or as an integrated configuration of a plurality of subordinate components. Thus, "modules"/ "engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Figure 4:
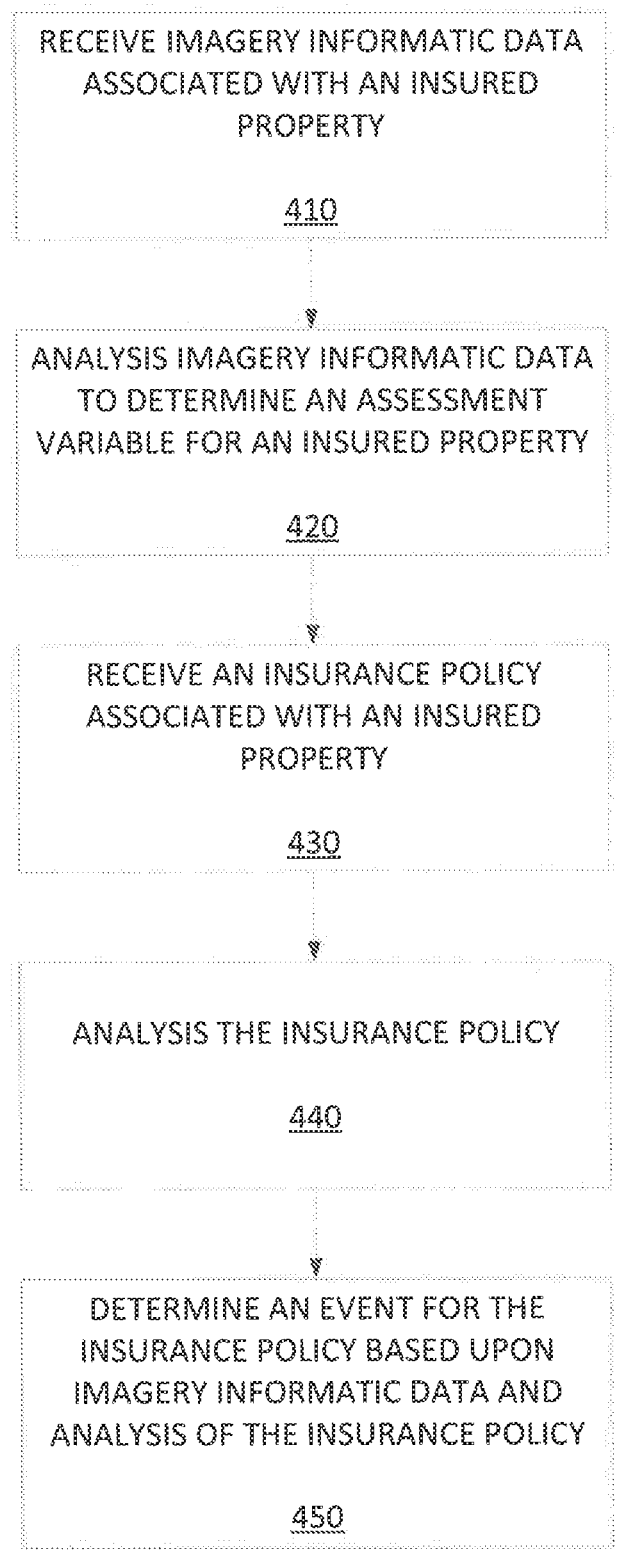

Yet another flow diagram in accordance with another embodiment is illustrated in FIG. 4. Starting at step 410, management module 105 receives imagery informatic data from one or more camera type sensor devices 90 preferably associated with an insured property.

Next, at step 420, preferably via imagery analysis engine 120, the received informatic data is analysed to determine an assessment variable regarding the insured property. It is to be appreciated the determined assessment variable may include: one or more risks associated with the insured property; detection of a structural alteration for the insured property (e.g., a change of one or more appliances in the insured property and/or a change in dimension or structure of the insured property). The determined assessment variable may further utilize computer object recognition technique(s) to determine a value for an object associated with the insured property by preferably comparison to a previous image of the object to determine a change in value for the object. Additionally, the determined assessment variable may include determining the location of a heat emitting object (e.g., a portable stove/space heater) in an insured property preferably utilizing received thermal imagery of the object, which may also include determining location of the aforesaid heat emitting object relative to another object (e.g., a fuel source (drapery)).

Management module 105 then preferably electronically retrieves an insurance policy associated with the insured property, preferably via record retrieval techniques, step 430. Preferably via the policy analysis engine 140, the retrieved insurance policy is analysed to determine insurance coverage terms and conditions for the insured property, as prescribed by the retrieved insurance policy (e.g., coverage types and definitions, premiums, deductibles, claim types, notice provisions, etc.), step 440.

The aforementioned determined assessment variable (step 420) and determined insurance coverage terms and conditions (step 440) are further preferably analysed by management module 105 to determine an event relating to the insurance policy associated with the insured property, step 450. It is to be appreciated a determined event may consist of an action to be taken regarding the insurance policy for the insured property based upon the received imagery informatic data from the one or more camera type sensor devices 90. For instance, such an event may include (but is not to be understood to be limited to) adjusting one or more terms of the insurance policy, determine an object's value or replacement cost, determine occurrence of an insurance loss/claim event, initiate an insurance claim, perform insurance underwriting decisions, determine additional insurance products to be recommended for inclusion with the insurance policy, and the like.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system, comprising:
   an infrared camera, configured to capture one or more images of a property; and
   one or more processors, configured to:
   receive an image of the property from the infrared camera, the image of the property comprising thermal imagery;
   identify, in the image of the property, an object and a heat source currently emitting heat, the heat source identified based upon a temperature differential provided in the thermal imagery;
   determine a distance between the object and the heat source in the image of the property;
   calculate a distance threshold based on a temperature of the heat source indicated by the temperature differential, wherein the distance threshold indicates a minimum safe distance between the object and the heat source;
   determine whether the distance between the object and the heat source meets the distance threshold or is less than the distance threshold;
   responsive to a determination that the distance between the object and the heat source is less than the distance threshold, send a notification, via the one or more processors over a computer network, indicating that the distance between the object and the heat source is less than the distance threshold;
   receive a second image from the infrared camera;
   identify the object and the heat source in the second image;
   determine a second distance between the object and the heat source in the second image;
   determine whether the second distance between the object and the heat source meets the distance threshold or is less than the distance threshold; and
   responsive to a determination that the second distance between the object and the heat source is less than the distance threshold, send a notification, via the one or more processors over the computer network, indicating that the second distance between the object and the heat source is less than the distance threshold.

2. The system of claim 1, wherein the distance threshold comprises a first distance threshold associated with the heat source having a first temperature and a second distance threshold associated with the heat source having a second temperature.

3. The system of claim 1, wherein the one or more processors are configured to determine a flammability of the object and the distance threshold based on the flammability of the object.

4. The system of claim 1, wherein the one or more processors are configured to determine a temperature of the heat source in the image of the property, a flammability of the object, and the distance threshold based on a combination of the temperature of the heat source and the flammability of the object.

5. The system of claim 1, wherein the second image is an image of the property, wherein the heat source, the object, or both are rearranged.

6. The system of claim 1, wherein the one or more processors are configured to, responsive to a determination that the distance between the object and the heat source meets the distance threshold, send a notification, via the one or more processors, over the computer network, indicating that the distance between the object and the heat source meets the distance threshold.

7. The system of claim 1, wherein the one or more processors are configured to,
   responsive to the determination that the distance between the object and the heat source is less than the distance threshold, identify one or more insurance products to mitigate liability risks for the object.

8. The system of claim 1, wherein the one or more processors are configured to, responsive to the determination that the distance between the object and the heat source is less than the distance threshold, receive data indicative of a risk mitigation opportunity.

9. A tangible, non-transitory, machine-readable medium, comprising machine-readable instructions that, when executed by one or more processors, cause the machine to:
   receive an image of a property from an infrared camera, the image of the property comprising thermal imagery;
   identify, in the image of the property, an object and a heat source currently emitting heat, the heat source identified based upon a temperature differential provided in the thermal imagery;
   determine a distance between the object and the heat source in the image of the property;
   calculate a distance threshold based on a temperature of the heat source as indicated by the temperature differential, wherein the distance threshold indicates a minimum safe distance between the object and the heat source;
   determine whether the distance between the object and the heat source meets the distance threshold or less than the distance threshold;
   responsive to a determination that the distance between the object and the heat source is less than the distance threshold, send a notification, via the one or more processors, over a computer network, indicating that the distance between the object and the heat source is less than the distance threshold;
   receive a second image from the infrared camera;
   identify the object and the heat source in the second image;
   determine a second distance between the object and the heat source in the second image;
   determine whether the second distance between the object and the heat source meets the distance threshold or is less than the distance threshold; and responsive to a determination that the second distance between the object and the heat source is less than the distance threshold, send a notification, via the one or more processors over the computer network, indicating that the second distance between the object and the heat source is less than the distance threshold.

10. The machine-readable medium of claim 9, comprising machine-readable instructions that, when executed by one or more processors, cause the machine to, responsive to a determination that the distance between the object and the heat source meets the distance threshold, send a notification, via the one or more processors over the computer network, indicating that the distance between the object and the heat source meets the distance threshold.

11. The machine-readable medium of claim 9, comprising machine-readable instructions that, when executed by one or more processors, cause the machine to, responsive to the determination that the distance between the object and the heat source is less than the distance threshold, identify one or more insurance products to mitigate liability risks for the object.

12. The machine-readable medium of claim 9, comprising machine-readable instructions that, when executed by one or more processors, cause the machine to, responsive to the determination that the distance between the object and the heat source is less than the distance threshold, receive data indicative of a risk mitigation opportunity.

13. A method, comprising:
receiving, via one or more processors, an image of a property from an infrared camera, the image of the property comprising thermal imagery;
identifying, in the image of the property, via one or more processors, an object and a heat source currently emitting heat, the heat source identified based upon a temperature differential provided in the thermal imagery;
determining, via one or more processors, a distance between the object and the heat source in the image of the property;
calculating, via one or more processors, a distance threshold based on a temperature of the heat source indicated by the temperature differential, wherein the distance threshold indicates a minimum safe distance between the object and the heat source;
determining, via one or more processors, whether the distance between the object and the heat source meets the distance threshold or is less than the distance threshold;
responsive to a determination that the distance between the object and the heat source is less than the distance threshold, sending, via one or more processors, a notification, over a computer network, indicating that the distance between the object and the heat source is less than the distance threshold;
receiving a second image from the infrared camera;
identifying the object and the heat source in the second image;
determining a second distance between the object and the heat source in the second image;
determining whether the second distance between the object and the heat source meets the distance threshold or is less than the distance threshold;
responsive to a determination that the second distance between the object and the heat source is less than the distance threshold, sending a notification, via the one or more processors, over the computer network, indicating that the second distance between the object and the heat source is less than the distance threshold; and
responsive to a determination that the distance between the object and the heat source meets the distance threshold, sending a notification, via the one or more processors, over the computer network, indicating that the distance between the object and the heat source meets the distance threshold.

14. The method of claim 13, comprising, responsive to the determination that the distance between the object and the heat source is less than the distance threshold, identifying one or more insurance products to mitigate liability risks for the object.

* * * * *